3,658,899
MELT-ZONE SALT-OUT CRYSTALLIZATION
Robert W. Campbell, Bartlesville, Okla., assignor to
Phillips Petroleum Company
No Drawing. Filed Mar. 11, 1969, Ser. No. 806,280
Int. Cl. B01j 9/18; C07c 143/70
U.S. Cl. 260—543 R                9 Claims

ABSTRACT OF THE DISCLOSURE

A binary or more complex mixture containing a target compound to be separated therefrom is dissolved in a first solvent and frozen. A second solvent is added as a liquid phase and the resulting mixture is allowed to equilibrate, resulting in the separation of pure target compound.

This invention relates to the new and useful techniques for the separation of two or more materials from a mixture thereof.

It has long been a problem in industry, specifically the chemical and petroleum industries, to separate mixtures into various component parts. Such separations are desirable to improve product quality by removing impurities or to simply separate components which have greater value when not associated with other components.

Many separation procedures are well known. For example, where relatively low boiling materials of different boiling points are in admixture, fractional distillation may be a suitable unit operation. However, fractional distillation is not suitable for separation of those materials which are homoreactive at temperatures required for distillation or are reactive with other components in the mixture which is to be separated.

In more recent years, a procedure known as zone melting has been developed and found particularly applicable in the metallurgical industries. The value of this mode of separation is based on the different melting points of components. By passing a hot zone from one end to the other of an elongated mass of an impure alloy, the impurities may be concentrated at one end of the mass. See Zone Melting, W. G. Pfann, John Wiley and Sons, New York (1958). While this technique is of value for the separation of materials having good crystallinity, it cannot be applied to the refinement of less crystalline components. This drawback has been noted in the literature, Ball et al., the Refining Engineer, December 1958, p. C 36.

The ineffectiveness of zone melting for purifying systems with ill-defined crystal form is probably due to entrapment of mother liquor between crystals during crystallization. The effect of this phenomenon would be to prevent diffusion of impurities out of the solid being purified.

Still another separation procedure which has come into use in recent years is fractional crystallization. This technique is described in U.S. patent to Schmidt, 2,617,274, and reissued 23,810 (1954). It is further described in U.S. Pat. Nos. 2,815,364, 2,822,249, 2,839,411, 2,890,938, and 2,890,962. Basically, in this separation process, the crystals obtained from one batch crystallization are redissolved in a solvent or remelted and further crystallized. This process is repeated until the desired purification is obtained.

A still further development in this area, zone precipitation, is described in U.S. 3,088,907. In zone precipitation, the binary or more complex mixture to be separated is dissolved throughout a suitable solvent and cooled to form a solid column or elongated mass. A hot zone is moved relative to the column and the least soluble components in the column crystallize behind the moving front zone. Hence, the most soluble components remain in the liquid and move in the direction of the moving zone. After the zone has passed over the entire column, the components of greatest solubility will be depleted behind the zone and concentrated in the direction of separation. By repeated passes, a greater degree of separation may be obtained. While this technique is of value for the separation of materials, it cannot be applied to the refinement of materials which oil out upon freezing, that is, form a near-solid plastic state rather than definite crystalline structure.

It is, therefore, an object of this invention to provide a new separation process.

It is yet another object of this invention to provide a new separation process for materials which are not easily separated by prior art separation techniques.

It is yet another object of this invention to provide a new separation process for the separation of those materials which form oils or pseudo-plastic material upon cooling a solution comprising said material and solvents in which said materials can be dissolved.

SUMMARY OF INVENTION

In accordance with the instant invention, it has been found that the foregoing disadvantages inherent in heretofore known separation techniques may be overcome by melt-zone salt-out crystallization.

According to the process of this invention, the binary or more complex mixture containing a target compound to be separated therefrom is dissolved in a suitable first solvent, and cooled to form a frozen mass. A second solvent is added as a liquid phase to said frozen mass, said second solvent being miscible with said first solvent and being a non-solvent for said target compound. The resulting mixture is allowed to equilibrate resulting in the separation of pure solid target compound. In another embodiment, the mixture of said frozen mass and said second solvent is warmed to a temperature above melting point of said first solvent and said binary or complex mixture, but below the melting point of said target compound such that said target compound is separated as a solid.

DESCRIPTION OF PREFERRED EMBODIMENTS

This invention finds particular utility in separating a target compound from a binary or complex mixture containing same, which target compound will not crystallize into pure separable crystals by cooling a solution of said binary or complex mixture in solvents. Surprisingly the process of the instant invention is operable for mixtures which cannot be separated by prior art salt-out procedures in which a binary or more complex mixture is dissolved in a suitable solvent forming a liquid solution to which is added a non-solvent for said target compound in such quantities that said target compound salts-out, that is, precipitates. Certain target compounds become so closely associated because of similarities in chemical structures, weak hydrogen bonding, attraction by van der Waals forces, and other weak electronic bonds which are not strong enough to be classified as true ionic or covalent chemical bonds, with solvents in which they can be dissolved such that when subjected to normal salt-out procedures said target compounds form oils comprising said target compound and solvent rather than separable crystalline material. Since solvent is present in said oils, impurities are hence partitioned between said solvent and said non-solvent such that the separation of target compound from either the solvent or other impurities is not effected.

Although not wishing to be bound to any one particular theoretical explanation, it is hypothesized that in the system of the instant invention, during the actual purification, three phases are present. The three phases are a liquid phase comprised of solvent and non-solvent and some impurity, a solid phase comprised of pure crystalline target compound, and a solid phase comprised of frozen solution containing said target compound, solvent, and other impurities contained in the original mixture. Said solvent and said other impurities enter the non-solvent phase leaving pure crystalline target compound as said frozen solution dissipates.

The necessary criteria for selection of solvent and non-solvent for particular target compounds in binary or complex mixtures can be summarized as follows:

(1) The target compound and the other components of said binary or complex mixture, hereinafter called impurities, must be substantially soluble in the solvent.

(2) The impurities and solvent must be soluble in the non-solvent.

(3) The target compound must be insoluble both in said non-solvent and in a solution comprised of solvent and non-solvent.

(4) The target compound must have a higher melting point than the solvent, non-solvent, or mixtures thereof.

(5) It must be possible to form a frozen mass comprised of said target compound, solvent, and impurities. It has been hypothesized that said frozen mass can be thought of as a solid solution.

According to one embodiment of this invention, a complex solution comprised of solid organic material containing a target compound and impurities is dissolved in an organic solvent forming a solution which is frozen. A liquid non-solvent for said target compound is brought into contact with said frozen solution at a temperature below the melting point of the target compound. As said frozen solution in contact with said non-solvent is allowed to equilibrate with said non-solvent, a mass transfer zone slowly passes from the surface of said frozen solution inwardly. As the zone passes from the surface to the interior of said frozen solution, the target compound separates and said solvent and impurities dissolve in said liquid non-solvent resulting in a solid phase of pure crystalline target compound and a liquid phase comprising said non-solvent, solvent, and impurities.

In a presently preferred embodiment, said non-solvent is at a temperature warmer than said frozen solution but below the melting point of the target compound when it is brought into contact with said frozen solution. The frozen solution is then allowed to equilibrate to the temperature of the nonsolvent.

The process of this invention can be effected in any suitable equipment as is apparent to those skilled in the art. For example, when solid target compound is more dense than the solution, frozen pieces of the original solution can be charged to the upper end of a rotating cylindrical separator while the non-solvent is charged at the lower end. Temperatures and speeds of rotation can be regulated so that as pieces of frozen solvent-target compound tumble toward the bottom of the separator, they are melted as the solid target compound continues to the bottom. The liquid mixture of solvents is carried out at the top to subsequent separation such as by distillation or the like and recycled. The crystalline product is recovered at the lower end of the separator, and can be centrifuged of solvent, wash, and the like. The above is only an example of numerous mechanical implementations that can be employed to apply the process of this invention.

The process of the instant invention is particularly suited to the separation of hydroxybenzenesulfonyl halides, most preferably, para-hydroxybenzenesulfonyl chloride, from the reaction medium in which it is produced. In general, hydroxybenzenesulfonyl halides can be separated from the reaction products of hydroxybenzenesulfonates and a halogen donor selected from thionyl halides, phosphorus oxyhalides and carbonyl halides. The cation of the sulfonate can be an alkali metal such as sodium, potassium, lithium, rubidium and cesium. The halogen of the resulting sulfonyl halide will, of course, be the same as that in the halogen donor, i.e., the thionyl halide, phosphorus oxyhalide or carbonyl halide. As described in copending application, Ser. No. 806,281, filed Mar. 11, 1969, the above reaction can be effected in the presence of an organic phosphorus catalyst selected from tri-substituted phosphoric acid, phosphine, or phosphine oxide derivatives which can be represented by the formulas:

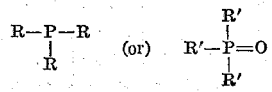

wherein R is alkyl, cycloalkyl, aryl, or combinations thereof, such as alkaryl or aralkyl having in the range of about 1 to 8 carbon atoms; and wherein R' is R, R—O—, or (R)$_2$—N—. Such compounds include hexahydrocarbyl phosphoric triamides, trihydrocarbyl phosphates, trihydrocarbyl phosphines, and trihydrocarbylphosphine oxides. Amounts of catalysts not exceeding about 25 parts by weight of catalyst per 100 parts of hydroxybenzenesulfonate are most suitable. Reaction temperatures in the range of about 0° C. to about 100° C. are usually employed in this process although higher and lower temperatures can be employed. Mole ratios of the hydroxybenzenesulfonate to halogen donor are ordinarily in the range of 1:0.5 to 1:50.

As described in copending application, Ser. No. 806,283, filed Mar. 11, 1969, the above reaction can be effected in the presence of catalytic amounts of an acylated amine which include one or more acylated secondary amine moieties, e.g.,

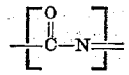

moieties, that contain in the range of 3 to 15 carbon atoms, and that optionally, in addition to the secondary amine moieties, can contain in the range of 0 to 3 atoms of sulfur, oxygen and nitrogen provided that such atoms of sulfur, oxygen, and nitrogen are not bonded to hydrogen. Some exemplary classes of such promoters are represented as follows:

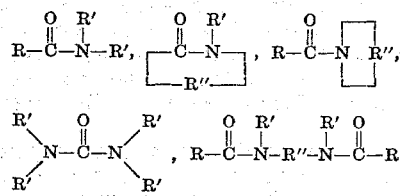

where R is H or alkyl, cycloalkyl, aryl, or combinations thereof containing in the range of 1 to 10 carbon atoms; where R' is alkyl, cycloalkyl, aryl or combinations thereof having in the range of 1 to 10 carbon atoms; and where R" is a divalent organic radical containing in the range of 3 to 10 carbon atoms and from 0 to 3 atoms selected from sulfur, oxygen, and nitrogen, provided that such atoms of sulfur, oxygen, or nitrogen are not bonded to hydrogen. Some examples of these promoters include N-methylpyrrolidone, N-acetylpyrrolidine, N-acetylurea, dimethylformamide, tetrapropylurea, N,N-dibutylbenzenecarboxamide, N-cyclohexyl-N-methyl(2-methylbenzene)carboxamide, N,N-dibenzylformamide, N-acetylmorpholine, N,N'-diacetylpiperazine, N-butylpyrrolidone, N,N'-diacetyl-N,N'-dimethylhexanediamine, and the like. The concentration of the amine promoters employed should not exceed about 10 parts per 100 parts by weight of the hydroxybenzenesulfonate. Reaction temperatures in the range of about 0 to about 100° C. are usually employed in this process although higher and lower temperatures can be employed. Mole ratios of the hydroxybenzenesulfonate to halogen donor are ordinarily in the range of 1:0.5 to 1:50.

As described in copending application, Ser. No. 806,282, filed Mar. 11, 1969, now U.S. Pat. 3,549,595, the hydroxybenzenesulfonyl halides separated by the process of the instant invention have utility as precursors for the production of poly(phenylenesulfonate) polymers. Hydroxybenzenesulfonyl halides are condensed in solution in a solvent selected from cyclic ketones such as cyclohexanone, cyclododecanone, and the like, and mixtures thereof and polar carboxylic acid amides having no hydrogen atoms bonded to nitrogen atoms such as N-methylpyrrolidone, dimethylacetamide, dimethylformamide and the like and mixtures thereof and a hydrogen halide acceptor including alkaline earth metal hydroxides and tertiary amines. Relatively low temperatures in the range of from about 0° C. to about −70° C. are employed and the monomer must be present in the range of from about 10 to about 30 grams per ml. of solution. Films of poly(phenylenesulfonates) have been produced having tensile strengths of 6885 p.s.i.g. with an elongation of 2 percent.

It has been impossible to obtain relatively pure parahydroxybenzenesulfonyl chloride employing prior art separation techniques described above. Attempts to recrystallize crude para-hydroxybenzenesulfonyl chloride from solvents such as diethyl ether, hexane, benzene, dichloromethane, and mixtures thereof have been unsuccessful. The crux of the matter is that these solvents associate so closely with the para-hydroxybenzenesulfonyl chloride that ordinary methods of separation do not effect the separation but result in an oil phase of the para-hydroxybenzenesulfonyl chloride and the materials to be separated therefrom. For example, in a liquid-liquid phase separation, oil-out occurs rather than crystallization upon lowering of temperature.

Infra-red data indicate that impurities found in association with the para-hydroxybenzenesulfonyl chloride product include a fairly large amount of dimethylformamide and substantial amounts of para-hydroxybenzenesulfonic acid and at least one of the following:

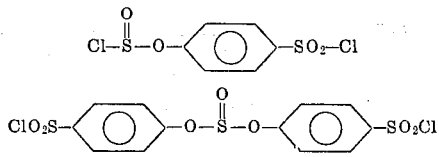

From their nature one would expect that all of these materials are quite soluble in para-hydroxybenzenesulfonyl chloride and are relatively non-volatile. These characteristics and the fact that para-hydroxybenzenesulfonyl chloride is homoreactive and should not be heated inherently preclude most ordinary separation techniques, such as distillation, vacuum stripping, solvent extraction, and the like.

It has now been surprisingly found that if a solution of a hydroxybenzenesulfonyl halide, for example parahydroxybenzenesulfonyl chloride, and the above listed impurities in an aromatic solvent meeting the criteria listed above is frozen, and then contacted with a liquid phase of an alkane, cycloalkane, or alkylcycloalkane meeting the criteria listed above and then warmed to a temperature below the melting point of para-hydrobenzenesulfonyl chloride, but above the melting point of the frozen mass that relatively pure crystals of para-hydroxybenzenesulfonyl chloride separate out while leaving a mother liquor comprising the alkane, the aromatic solvent, and impurities. This is quite surprising in view of the fact that if a mixture is formed comprising parahydroxybenzenesulfonyl chloride, aromatic solvent, alkane, and impurities is frozen and is then allowed to equilibrate to the same temperature as above that no crystals are formed and only an oily layer containing aromatic parahydroxybenzenesulfonyl chloride and impurities forms.

The aromatic solvents found to be useful in the above application are benzene (M.P. 5.5° C.) and alkylaromatics, such as alkylbenzenes, having melting points from about −20° C. to about 60° C. and meeting the above listed criteria. Examples of suitable alkylaromatics are p-xylene (M.P. 13.2° C.), 1,2,4,5-tetraethylbenzene (M.P. 13° C.), 1,2,3,4-tetraethylbenzene (M.P. 11.6° C.), 1,2,3,4-tetramethylbenzene (M.P. −6.3° C.), β-methylnaphthalene and the like. (Melting points from Langes Handbook of Chemistry, 9th edition, -956.) The melting point range is mainly an economic consideration as it should be obvious to one skilled in the art that toluene (M.P. −95° C.) could be used, but expensive refrigeration equipment would be necessary which could be avoided by selection of a solvent with a higher melting point. However, it should be equally obvious to one skilled in the art that even toluene will not work if the temperature employed in the cooling step is not low enough, as is demonstrated in Examples VI and VII below.

Non-solvents that can be employed in the above application are alkanes, cycloalkanes, and alkylcycloalkanes, preferably alkanes and cycloalkanes having from 5 to 10 carbon atoms per molecule, for example, hexane, cyclohexane, 2,2-dimethylpropane, pentane, decane, cyclodecane, methylcyclopentane, preferably hexane and cyclohexane. The non-solvent must also meet the criteria listed above.

The following specific embodiment wherein the process of this invention is employed to separate para-hydroxybenzenesulfonyl chloride, clearly demonstrates the value and operability of this invention, but is not intended and should not be construed as applying any limitations thereupon.

EXAMPLE I

A mixture comprised of 198.5 g. (1.6 mole) thionyl chloride and 3 g. of dimethylformamide was added at room temperature to a reactor in which was contained 65.0 g. (0.331 mole) of sodium para-hydroxybenzenesulfonate. The mixture was heated at 60° C. for four hours and the reaction mixture was then poured over 800 g. of ice, and the para-hydroxybenzenesulfonyl chloride, the oily lower layer, was extracted with 300 ml. of dichloromethane. The aqueous layer was extracted twice with 250 ml. of dichloromethane. The combined organic layers were extracted with 100 ml. of ice water and the organic layer was dried over magnesium sulfate, and the volatiles were stripped under vacuum. The material remaining, 56.9 grams, appeared as a viscous oil which over a period of one hour partly solidified. This material was designated as Product A.

EXAMPLE II

A total of 4 g. of Product A was stirred in 50 ml. of diethylether at about 25° C. Product A did not completely dissolve and after several minutes, 25 ml. of the clear diethylether was decanted and 100 ml. of hexane was added to the ether solution. The solution clouded; however, no precipitate was obtained even on cooling to −18° C.

A total of 50 ml. of ether was refluxed with 3 g. of Product A without complete dissolution. The hot solution was filtered and cooled to −18° C. Only a trace of solids was obtained; only oil separated to any extent. Even this trace appeared to be crystals growing out of an oil droplet. No additional solids beyond the trace were obtained when 100 ml. of hexane was added to the cooled diethylether solution.

EXAMPLE III

A total of 6.5 g. of Product A was dissolved in 40 ml. of benzene, dried over MgSO₄, filtered, and 80 ml. of hexane added. An oily lower layer quickly formed from the cloudy solution. This oil partially solidified over a period of time. Solvent was decanted and volatiles removed in vacuo. The product remaining was designated Product B.

EXAMPLE IV

A total of 6.5 g. of Product A was dissolved in 40 ml. of benzene and the solution was dried over MgSO$_4$. After filtering, the solution was frozen at −18° C. A total of 80 ml. of hexane was added and the mixture was allowed to thaw with stirring. White precipitate totaling 3.8 grams and having a melting point of 64–67° C. was collected by filtration and dried in vacuo and designated as Product C.

EXAMPLE V

A benzene solution of Product A was prepared in Example IV was frozen at −18° C. A total of 80 ml. of cyclohexane was added and the mixture was allowed to warm to room temperature with stirring. A white precipitate totaling 3.2 grams and having a melting point of 64–67° C. was collected by filtration and dried in vacuo, and designated as Product D.

EXAMPLE VI

A total of 3.5 g. of Product A was dissolved in 30 ml. of toluene and dried over MgSO$_4$. About 40 ml. of cyclohexane was added and the mixture clouded. An oily lower layer formed which eventually partially solidified. Solvent was decanted and volatiles were removed in vacuo leaving an oily residue which was designated Product E.

EXAMPLE VII

A total of 6.5 g. of Product A was dissolved in 40 ml. of toluene and the solution was dried over MgSO$_4$. The solution was cooled to −18° C., and 80 ml. of hexane was added. An oily layer formed immediately. The solvent was decanted and volatiles removed in vacuo. An oily residue remained which was designated Product F.

EXAMPLE VIII

A total of 6.5 grams of Product A was dissolved in 40 ml. of p-xylene and dried over MgSO$_4$. The resulting solution was filtered and frozen at −18° C. Eighty ml. of hexane was added and the mixture was allowed to warm RT with stirring. A white precipitate totaling 3.8 grams and having a melting point of 66–69° C. was collected by filtration and dried in vacuo and designated as Product G.

EXAMPLE IX

IR spectra were recorded for Samples A through G and the results are tabulated in the table below. The entry in Column 2 was obtained by dividing intensity of band at 2.9μ due to phenolic OH by the intensity of the band at 5.8μ due to dimethylformamide carbonyl. Larger numbers indicate a higher degree of purity. The band at 11.6μ is of unknown origin; however, it is from an impurity since it is not present in the spectrum of pure para-hydroxybenzene sulfonyl chloride.

| Sample | A 2.9μ /A 5.8μ | Band at 11.6μ |
|---|---|---|
| Product A | 1.10 | Strong. |
| Product B | 1.53 | Present. |
| Product C | 3.56 | Absent. |
| Product D | 2.44 | Do. |
| Product E | 1.71 | Strong. |
| Product F | 1.75 | Do. |
| Product G | 4.60 | Absent. |

These data indicate that although slight purification may have occurred in Products B, E and F; Products C, D and G gave much improved results.

These examples clearly demonstrate that ordinary methods of separation such as salt-out processes are not effective to separate compounds that tend to oil-out, such as para-hydroxybenzenesulfonyl chloride. They also demonstrate that the process of the instant invention effectively separates crystalline para-hydroxybenzenesulfonyl chloride.

These examples further demonstrate that methods such as melt zone precipitation are not suitable. A frozen solution of hexane-(para-hydroxybenzenesulfonyl chloride)-benzene could not be prepared, since para-hydroxybenzenesulfonyl and benzene have been shown to oil-out instead of forming a tertiary solution which could be frozen preparatory to implementation of the melt zone precipitation technique.

I claim:

1. A method of separating a solute from a solution thereof in a first solvent, said first solvent having a freezing point below that of said solute and said solution having a freezing point below that of said solute, comprising:
   (a) cooling said solution to a temperature at which it forms a frozen mass,
   (b) adding to said mass a second solvent as a liquid which is a non-solvent for said solute but is miscible with said first solvent forming a solution thereof which solution is also a non-solvent for said solute at a temperature at which said second solvent is a liquid, and
   (c) separating said solute as a solid by dissolving said first solvent in said second solvent to form a liquid phase.

2. The method of claim 1 wherein said solute is separated as a solid by warming said frozen mass to a temperature above the melting point of said frozen mass and below the melting point of said solute whereby said first solvent dissolves in said second solvent.

3. The method of claim 1 wherein said solution comprising solute and first solvent further consists of impurities having greater solubility in said liquid phase than in said solute.

4. The method of claim 3 wherein said solute is para-hydroxybenzenesulfonyl chloride.

5. The method of claim 4 wherein said first solvent is selected from an aromatic or an alkyl-substituted aromatic.

6. The method of claim 5 wherein said second solvent is selected from alkanes and cycloalkanes.

7. The method of claim 6 wherein said first solvent is benzene or p-xylene and said second solvent is hexane or cyclohexane.

8. A method of claim 1 wherein said second solvent which is a non-solvent for said solute is at a temperature warmer than said frozen mass but below the melting point of said solute.

9. A method according to claim 1 wherein said solute is para-hydroxybenzenesulfonyl chloride, the first solvent is an aromatic solvent having a melting point from about −20° C. to about 60° C., and said second solvent which is a non-solvent for said solute is selected from alkanes, cycloalkanes and alkylcycloalkanes having a melting point from about −20° C. to about 60° C.

References Cited

UNITED STATES PATENTS 2,822,249  2/1958  Jones  23—310
2,839,411  6/1958  Vela  99—205

LORRAINE A. WEINBERGER, Primary Examiner

E. J. GLEIMAN, Assistant Examiner

U.S. Cl. X.R.

23—309, 311, 312 A; 62—58